Figure 1:
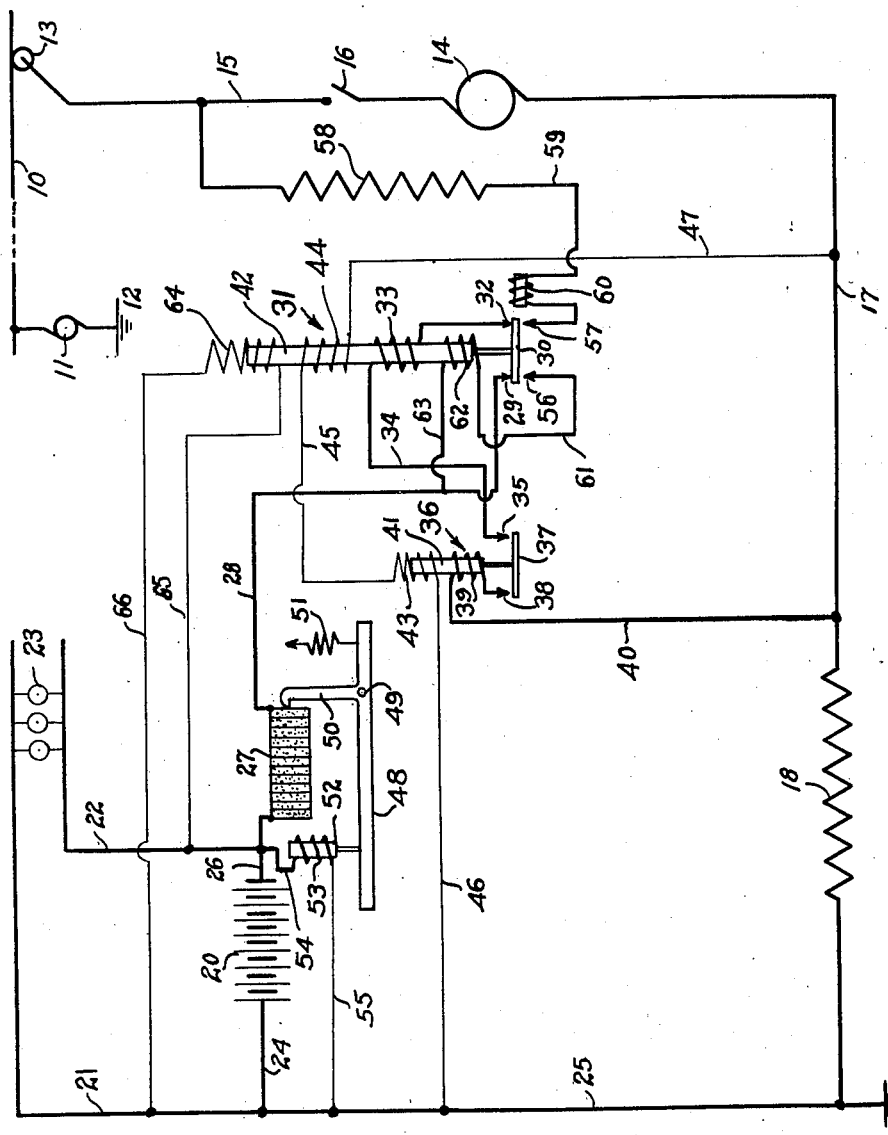

Aug. 14, 1928.  
W. T. KNIESZNER  
1,680,947  
STORAGE BATTERY CHARGING SYSTEM  
Filed March 19, 1925    2 Sheets-Sheet 1

William T. Knieszner INVENTOR.

BY

Robert S. Blair ATTORNEY.

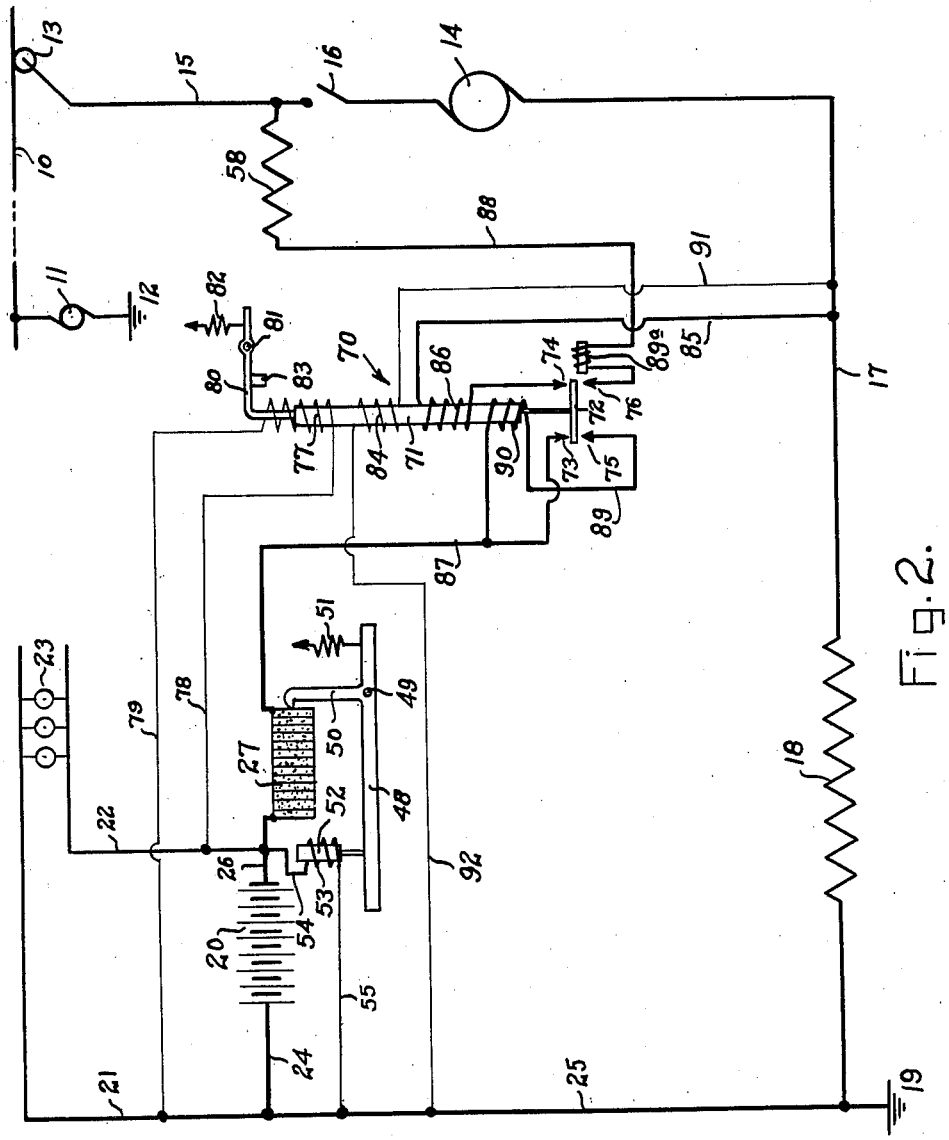

Patented Aug. 14, 1928.

1,680,947

UNITED STATES PATENT OFFICE.

WILLIAM T. KNIESZNER, OF NEW YORK, N. Y., ASSIGNOR TO THE SAFETY CAR HEATING & LIGHTING COMPANY, A CORPORATION OF NEW JERSEY.

STORAGE-BATTERY-CHARGING SYSTEM.

Application filed March 19, 1925. Serial No. 16,639.

This invention relates to the charging of storage batteries, and particularly to the charging and protection of storage batteries such as are used for example for auxiliary purposes on electrically propelled vehicles for supplying energy, for example to signal lights, the primary illumination of the car or train, the remote or multiple control system of the cars or train, and the like.

An object of this invention is to provide a simple but thoroughly reliable arrangement for maintaining the storage battery in the desired state of charge and for supplying the battery with charging current from the relatively high voltage power or transmission circuit in an efficient, dependable and economic manner. It is a further object of this invention to provide a system and apparatus in which the battery is reliably safeguarded against overcharge and in which the storage battery may be maintained in the desired state of charge irrespective of the various conditions of activity or inactivity of the vehicle or vehicles and to which the latter are in practice subjected. Another object is to provide simple but thoroughly practical apparatus of durable construction and of reliable operation for carrying out objects such as those set forth hereinabove, and to provide apparatus of the above-mentioned character which will be well adapted to meet the varying conditions of hard, practical use, and in which simplicity of construction and arrangement may be effectively combined with dependability of action. Other objects will be in part obvious or in part pointed out hereinafter.

The invention accordingly consists in the features of construction, combinations of elements, and arrangement of parts as will be exemplified in the structure to be hereinafter described and the scope of the application of which will be indicated in the following claims.

In the accompanying drawings there is diagrammatically illustrated in Figure 1 a possible embodiment of this invention; and in Fig. 2 is shown diagrammatically a preferred form of this invention.

Similar reference characters refer to similar parts throughout the various views in the drawings.

As conducive to a clearer understanding of this invention, it might at this point be noted that electrically propelled vehicles, particularly such as are used in subway or elevated transit service and in which most, if not all, of the cars or units of the train are self-propelled, are provided with a storage battery generally employed for supplying energy to the remote or multiple unit system of control, to the signal or emergency lamp circuit, and like purposes. This battery may also be utilized to supply energy to a primary lighting or lamp circuit in the car or in the train. This battery is desirably of relatively low voltage as compared with the voltage of the power or transmission circuit from which the vehicles or trains derive their motive power, and by way of illustration this storage battery may be considered to be a 16-cell battery. In such case the average charging voltage may be considered to be in the neighborhood of 40 volts.

On the other hand, the power or transmission circuit which supplies motive power to the train may have a voltage of, for example, 600 volts. It is one of the dominant aims of this invention to provide a simple and practical system and apparatus whereby such a storage battery, for example, may be effectively maintained in charged condition and safeguarded against overcharge in a thoroughly dependable manner.

Referring now to the drawing, and more particularly to Fig. 1, there is indicated at 10 a transmission line which may take any suitable form connected to one side of a suitable source of current such as a generator indicated at 11. This generator 11 may supply energy to the transmission line 10 at 600 volts, for example, and, as is the usual practice, the other side of this source of current is grounded as at 12. The vehicle carries a suitable current-collecting device 13 which may take any desirable form, such as a shoe or trolley, and this device 13 is adapted to collect the energy from the transmission line 10 as the vehicle is in transit or at rest.

The energy thus collected from the transmission line 10 may be used for operating various translating devices, and the latter may take the form, for example, of the main driving motor or motors of the car, or the motor which drives the air compressor for the vehicle air-brake system. By way of illustration, there is indicated at 14 a translating device which may be assumed to take the form of the motor which drives the air compressor, the circuit of this motor being completed from the collecting device 13 by way of conductor 15 through a controlling switch 16 and thence by way of conductor 17, a resistance 18, to ground at 19. Where the translating device takes the form of the compressor motor, the circuit of the motor will be closed at intervals, generally automatically, and the switch 16 may take the form, for example, of that diagrammatically illustrated in the co-pending application of Louis von Ohlsen Serial No. 2984, filed January 17, 1925.

The storage battery is indicated at 20 and is connected to conductors 21 and 22 which may be considered as being part of the "train line" and from which various devices may receive energy. By way of example, there are indicated at 23 lamps which may constitute the primary lighting circuit of the car or may be part of the emergency lamp or signal lamp system. One terminal of the storage battery 20 is connected by conductors 24 and 25 to one terminal of the resistance 18, specifically the grounded terminal of the resistance 18. The other terminal of the battery 20 is adapted to be connected to the other terminal of the resistance 18 through a circuit which may be traced as follows:— from battery 20, through conductor 26, a variable resistance taking the form preferably of a compressible carbon pile 27, conductor 28, switch contact 29, switch member 30 of a switch generally indicated at 31, switch contact 32, coil 33 of switch 31, conductor 34, contact 35 of a switch generally indicated at 36, switch member 37, switch contact 38, coil 39 of switch 36, and thence by way of conductor 40 to the other terminal of the resistance 18. When this last-mentioned circuit is complete, the storage battery 20 may receive a charging current from the main circuit in which the translating device or motor 14 is included.

This charging circuit is completed when both switch members 37 and 30 of the two switches 36 and 31, respectively, are in their uppermost position, and these members are brought into uppermost position as soon as the circuit of the motor 14 is closed by the switch 16. More specifically, it may be noted that the switches 36 and 31 may be of the solenoid type and hence are provided with cores 41 and 42, respectively, connected to the switch members 37 and 30. A coil 43 is so related to the core 41 of the switch 36 that the core 41 will be lifted and the switch 36 closed when the coil 43 is energized. A coil 44 is so related to the core 42 of the switch 31 that, when energized, core 42 will be lifted and the circuit, in which are included the switch contacts 39 and 32, will be closed. Preferably, coils 43 and 44 are connected in series (as by the conductor 45), and these two coils are connected so as to be responsive to the voltage drop in the resistance 18. Thus, one terminal of coil 43 is connected to the conductor 25 as by conductor 46, and one terminal of coil 44 is connected by conductor 47 to the conductor 17. Thus, as soon as the motor 14 is started, the resultant flow of current in the motor circuit and through the resistance 18 produces a voltage across the latter effective to energize coils 43 and 44 and thus to operate the switches 36 and 31, respectively, to connect the storage battery 20 in series with the motor 14 but in shunt relation to the resistance 18. The charging of the battery may thus proceed.

Included in the battery circuit, however, is the carbon pile 27. This carbon pile is operated upon by a lever 48 pivoted at 49 and provided with an arm 50 bearing against the unanchored end of the pile 27. A spring 51 is connected to the lever 48 and acts so as to tend to compress the pile 27 and lessen its resistance. Acting in opposition to the spring 51 is a solenoid comprising a core 52 suitably connected to the lever 48 and a coil 53 connected across the battery 20 as by the conductors 54 and 55. The resistance of the pile 27 when substantially compressed is so chosen or proportioned with respect to the characteristics of the battery 20 and with respect to the resistance 18 that a fraction of the total current taken by the motor 14 will pass through the shunted resistance 18 as will permit the battery to receive a charge at the desired rate. Should the charging rate tend to become excessive for any reason, the voltage impressed across the battery 20 necessary to maintain this excessive charging rate will increase, thus strengthening the coil 53 of the solenoid, and the latter becomes effective at once to increase the resistance of the carbon pile 27. The resistance of the battery circuit will thus be increased with respect to the resistance 18, and a readjustment of the division of current between the battery circuit and the resistance 18 is brought about to maintain the charging rate substantially constant.

As the charge of the battery proceeds, and as the battery approaches substantially full charge, the voltage necessary to maintain this charge is characterized by a substantial rise. This rise is somewhat abrupt due to the corresponding rise in the back voltage of the storage battery, and there results a corresponding strengthening of the coil 53 of the solenoid with a corresponding increasing of the resistance of the carbon pile 27. This action is effective to cut down the current flowing in the immediate battery circuit and to make the by-pass circuit or shunt resistance 18 carry more of the current than the motor circuit. Thus the battery is effectively safeguarded against overcharge.

Should the motor 14 be stopped, as by an opening of a circuit at the switch 16, coils 43 and 44 become de-energized and switch 36 is permitted to open thus to disconnect the battery from the shunted resistance 18 and prevent the battery from discharging through the latter.

Should the motor 14 remain inactive for a substantial period of time, thus making its corresponding circuit unavailable for charging the battery 20, provision is made for insuring the maintenance of the battery at a proper state of charge and thus to insure a ready supply of energy to the train line 21—22. The switch 31 will be seen to be double-acting in that the switch member 30 thereof coacts with two pairs of contacts, namely, contacts 29—32 in the charging circuit already hereinabove described, and another pair of contacts 56—57 in an auxiliary charging circuit. This auxiliary charging circuit may be traced substantially as follows:—from the conductor 15 (which is connected to the current-collecting device 13) through a suitable resistance 58, conductor 59, a blow-out coil 60, contact 57, switch member 30 (when in lowered position), contact 56, conductor 61, coil 62 of switch 31, conductor 63, conductor 28, carbon pile 27, conductor 26, battery 20, and thence by way of conductors 24—25 to ground at 19. Associated with the core 42 of the switch 31 is a coil 64 connected across the battery by way of conductors 65—22 and 66—21. Coil 64 is so proportioned with respect to the movable parts of the switch 31 and with respect to the characteristics of the battery 20 that it is strong enough to hold the switch member 30 in uppermost position as long as the battery 20 is in a condition other than that of substantial discharge. As soon, however, as the battery approaches substantial discharge, its voltage is characterized by a relatively abrupt drop. This abrupt drop acts to weaken the coil 64 sufficiently to permit it to drop the core 42 and to close the auxiliary charging circuit at the contacts 56—57. The resultant flow of charging current to the battery but through the current coil 62 is effective to securely hold the core 42 downwardly and hence the switch member 30 in good electrical contact with the contacts 56—57. Coil 62 is wound so as to oppose the action of coil 64 and is provided with sufficient turns to securely hold the switch member 30 in good circuit-closing engagement with the switch contacts.

The resistance 58 may be proportioned with respect to the relatively high voltage of the source 11 and with respect to the characteristics of the battery 20 so as to give the latter the desired charging rate. And it will be noted that included in this auxiliary charging circuit is the regulating carbon pile 27. Assuming that this charging circuit remain uninterrupted, as soon as the battery 20 approaches substantially full charge the abrupt rise in back voltage somewhat abruptly strengthens the coil 53 of the regulating solenoid and correspondingly increases the resistance of the carbon pile 27 to cut down the flow of charging current to the battery. At the same time, however, the increasing voltage across the battery 20 has strengthened the coil 64 of the switch 31, coil 64 tending to lift the core 42 and the switch member 30 to open the charging circuit at the contacts 56—67. But the action of the regulating carbon pile 27 not only cuts down the flow of charging current to the battery but also weakens the flow of current through the holding coil 62 of the switch 31. Thus the abrupt rise in back voltage of the battery is made effective to relatively rapidly strengthen coil 64 and at substantially the same rate to weaken the coil 62, thus permitting not only a relatively rapid opening of the switch 31 but also at a very low current flow through the switch contacts. The opening of the charging circuit at the contacts 56—57 may thus be achieved at a relatively small current flow, any tendency to spark at the contacts being counteracted by the blowout coil 60.

The coil 62, becoming de-energized upon the interruption of the above-mentioned auxiliary charging circuit, permits the coil 64 to hold the switch member 30 in bridging relation to the contacts 29—32 and places the main charging circuit in condition to be closed by the switch 36 should a subsequent operation of the motor 14 make available the motor circuit for charging the battery 20.

In case, however, that the motor circuit is made effective, as by closure of the switch 16, before the charge of the battery has been completed by way of the auxiliary charging circuit (with the switch member 30 in lowermost position), the coil 43 of switch 36 will be energized, as will also coil 44 of switch 31. The latter is related to the remaining coils of the switch 31 so as to oppose the action of coil 62 in holding the switch member 30 downwardly and to aid the action of coil 64 in tending to move the core 42 upwardly. Thus the coil 44 is effective to place the main charging circuit, as by bridging the contacts 29—32, in condition to be closed by the switch 36, the latter being actuated by the energized coil 43. The subsequent flow of charging current through the current coils 39 and 33 of the two switches 36 and 31, respectively, is effective through these coils to hold the corresponding switch members securely in circuit-closing position.

In Figure 2 of the drawings there is illustrated a preferred apparatus for carrying out certain features of this invention. The storage battery 20 is related to two charging circuits, in general similar to those described in connection with Figure 1, but the control of these circuits is effected by a single double-acting switch, thus to minimize the necessary apparatus and equipment and to add to this advantage ruggedness of construction as well as reliability of control. This control device or switch is generally indicated at 70 and includes a core 71 having connected thereto the switch member 72. Related to this switch member 72 are two pairs of contacts 73—74 and 75—76. With the switch member 72 in contact with the contacts 73—74 the storage battery 20 and regulating resistance 27 will be shunted about the resistance 18 in the circuit of the motor 14, so that the battery 20 may receive charging current from this circuit; with the switch member 72 in lower position and bridging the contacts 75—76 the battery 20 and regulating resistance 27 will be connected serially with respect to the resistance 58 in the auxiliary charging circuit.

About the core 71 of the switch 70 are made active the several coils for controlling the movement of the core 71 and hence of the switch member 72. One of these coils 77 is bridged across the battery 20, as by the conductors 78—22 and 79—21, and this coil 77 is so proportioned with respect to the movable parts of the switch that it will hold the core 71 in upper position as long as the battery 20 is in a state of charge other than substantial discharge; the coil 77, however, is prevented from raising the core 71, and hence the switch member 72, sufficiently to bridge the contacts 73—74, by means of a lever 80 engaging the upper end of the core 71 and pivoted as at 81. A spring 82 acts upon the lever 80 to tend to move the latter in counter-clockwise direction about its pivot 81 and to hold the lever against a stop 83. The spring 82 is of a sufficient strength so that the coil 77, when sufficiently energized as above noted, can not alone overcome the spring 82. Hence, with the battery in a condition other than substantial discharge, the core 71 will be held against the lever 80 in substantially the position shown in the drawing, and in this position the switch member 72 will be seen to be out of contact with both pairs of associated contact members, and hence to be in neutral position.

Assuming now that the motor circuit is closed, as by a closure of the switch 16, the resultant flow of current through the resistance 18 in this motor circuit results in a potential drop sufficient to energize a coil 84 about the core 71; coil 84 is wound and related with respect to the coil 77 so as to assist the latter. The two coils together overcome the restraining action of the spring 82 and move the core 71 out of neutral position and cause the latter to carry the switch member 72 into bridging relation to the contacts 73—74. The battery 20 with the resistance 27 will thus be connected in shunt relation to the resistance 18 and placed in position to receive a charging current from the main or motor circuit. Specifically, the flow of charging current to the battery 20 may take place through the following circuit:—from the grounded source of current 11, transmission line 10, collecting device 13, conductor 15, switch 16, motor 14, conductor 17, conductor 85, through the current coil 86 about the core 71, contact 74, switch member 72, contact 73, conductor 87, regulating resistance 27, battery 20, conductor 25, to ground at 19. The flow of charging current through the current coil 86 is effective to assist coils 84 and 77 to securely hold the switch member 72 in good electrical contact with the members 73—74. Thus the charging of the battery 20 may proceed. As the battery approaches full charge, the rise in voltage across the battery strengthens the action of the solenoid 52—53, causing the latter to materially increase the ohmic resistance of the carbon pile 27, and thus causing the charging current to be cut down, the change in the resistance 27 causing a re-adjustment of the division of the motor current between the battery circuit and the resistance 18. Thus the battery is protected against overcharge.

Should the motor circuit be interrupted, as by opening switch 16, coil 84 of switch 70 will be de-energized, as will also the current-holding coil 86, leaving only the battery-responsive coil 77 effective upon the core 71 of the switch 70. But this coil 77 is insufficient to overcome the action of spring 82 and the latter thus effects, through a return movement of the lever 80 against its stop 83, a return of the core 71, and hence of the switch member 72, to neutral position, this being the position shown in Figure 2.

Should the motor circuit be unavailable for charging the battery 20, the continued discharge of the battery 20 is accompanied by a gradual fall in voltage and hence by a gradual decrease in strength of the coil 77 of switch 70. When the battery 20, however, approaches discharge, the voltage of the battery falls somewhat abruptly; this results in such a material weakening of the coil 77 that the latter is incapable of holding the core 71 up against the lever 80; whereupon the core 71 and the switch member 72 descend, the latter member bridging the contacts 75—76 and completing an auxiliary charging circuit for the battery which may be traced as follows:—from the grounded source of current 11, transmission line 10, collecting device 13, conductor 15, resistance 58, conductor 88, blowout coil 89ª, contact 76, switch member 72 (now in lowermost position), contact 75, conductor 89, current coil 90, conductor 87, regulating device 27, battery 20, conductor 25, to ground at 19. The current coil 90 of switch 70 is wound so that when energized by the resultant flow of charging current in this circuit it will oppose the tendency of the coil 77 to raise the core 71, and coil 90 preferably has a sufficient number of turns to effectively hold the core 71 in lowermost position and hence to securely hold the switch member 72 in electrical contact with the contacts 75—76. The charging of the battery may thus proceed.

As the battery 20 approaches substantially full charge, the attendant somewhat abrupt rise in voltage across the battery 20 correspondingly strengthens the coil 77 to switch 70, this coil acting in a direction to move the switch member 72 into neutral position; but accompanying the strengthening of the coil 77 is a somewhat similarly abrupt increase in the strength of the solenoid 52—53, the latter thus materially and rapidly increasing the ohmic resistance of the regulating resistance 27. This increase in ohmic resistance of the device 27, accompanied by the decrease in charging current due to the normal rise of voltage of the battery toward the end of charge, brings about a rapid decrease in the charging current and hence in the holding action of the current coil 90 of the switch 70. The holding action of the coil 90 is thus rapidly diminished so that the now strengthened coil 77 of switch 70 may quickly overcome the greatly weakened holding effect of the coil 90 and lift the core 71, and hence the switch member 72, into neutral position with the core 71 against the lever 80. Thus a secure electrical contact between the switch member 72 and the contacts 75—76 may be maintained throughout the charge of the battery and sparking at the opening of the circuit at these points avoided. Any tendency to spark as the member 72 is moved upwardly into neutral position may be counteracted by means of the blowout coil 89ª.

Should the motor circuit be made effective or available for charging the battery 20 while the latter is receiving a charge by way of the auxiliary charging circuit, that is, while the switch member 72 is held in lowermost position by the coil 90, the energization of the coil 84 (due to the resultant potential drop across the resistance 18) effects an upward movement of the core 71 to break the charging circuit at the contacts 75—76 and to close the main charging circuit at the contacts 73—74. Coil 84 is connected across the resistance 18 by means of conductors 90—25 on the one hand, and by means of conductor 91 on the other; and the relation of coil 84 to the coil 77 is, as already hereinbefore noted, such that it will assist the coil 77 and, together therewith, move the core 71, and hence switch member 72, into their uppermost position against the action of the current-holding coil 90 and the spring 82. This movement of the switch is rapid, and any tendency to produce sparking at the opening of the charging circuit at contacts 75—76 may be counteracted by the blowout coil 89ª. The charging and protection of the battery in this motor circuit may thence proceed as already hereinbefore described.

It will thus be seen that there has been provided in this invention a system for charging the storage battery from a relatively much higher source of voltage than that of the battery, in which the several objects of this invention, as well as many practical advantages, are achieved. It will be seen that effective safeguarding of the battery against overcharge may be achieved in a simple but thoroughly practical and reliable manner irrespective of which circuit is made effective to charge the battery, and that this advantage is achieved with a minimum of apparatus. Moreover, it will be seen that the controlling device or devices may readily be embodied in rugged and durable form, may thus dependably withstand the hard conditions of practical use, and yet may effect in a thoroughly dependable manner the desired operation of the system.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim as my invention:

1. In apparatus of the character described, in combination, a circuit adapted to be connected to a source of current and having included therein a translating device and a storage battery connected so that when said device receives current from said source said battery will also receive current therefrom, an auxiliary circuit adapted to be connected to said source of current and arranged to supply charging current to said battery independently of said first-mentioned circuit, means adapted alternatively to close either of said battery charging circuits, and means for cutting down the flow of current to said battery as the latter is substantially fully charged, said means being effective in either of said circuits and adapted when effective in said first-mentioned circuit to cut down the flow of current to said battery without affecting the supply of current to said translating device from said source.

2. In apparatus of the character described, in combination, a circuit adapted to be connected to a source of current and having included therein a translating device and a storage battery connected so that when said device receives current from said source said battery will also receive current therefrom, an auxiliary circuit adapted to be connected to said source of current and arranged to supply charging current to said battery independently of said first-mentioned circuit, means responsive to a function of the current supplied to said storage battery for controlling the current thereto, said means being effective in either of said circuits, and means for opening one of said circuits when said battery approaches substantially full charge.

3. In apparatus of the character described, in combination, a circuit adapted to be connected to a source of current and having included therein a translating device and a storage battery so connected that when one receives current from said source the other will also, regulating means for controlling the charge of said battery arranged to permit the current flow to said battery to be cut down as the battery approaches substantially full charge but without affecting the operation of said translating device, an auxiliary circuit adapted to be connected to said source of current and to have included therein said battery and said regulating means, and means for closing either of said circuits.

4. In apparatus of the character described, in combination, a storage battery, an intermittently effective circuit adapted to have said battery connected thereto for charging, a by-pass circuit around said battery, an auxiliary circuit adapted to have said battery connected thereto when said first-mentioned circuit is ineffective, and means responsive to the state of charge of said battery arranged to be effective in said first circuit to determine the amount of current by-passed around said battery and to be effective in said auxiliary circuit to cut down the flow or current to said battery as the latter approaches substantially full charge.

5. In apparatus of the character described, in combination, a storage battery, an intermittently effective circuit adapted to have included therein said battery for charging, an auxiliary circuit adapted to have said battery connected thereto when said first-mentioned circuit is ineffective, means associated with one of said circuits for by-passing current around said storage battery, and means responsive to the state of charge of said battery and arranged to be effective in one circuit to determine the amount of current by-passed through said by-pass means and effective upon the other circuit to cut down the flow of current to the battery as the latter approaches substantially full charge.

6. In apparatus of the character described, in combination, a storage battery, and a translating device arranged serially in a circuit so that said battery receives a charging current when said translating device is operating, a shunt resistance around said battery, an auxiliary circuit adapted to permit charging of said battery when said translating device is ineffective, and means responsive to the state of charge of said battery and arranged to control the amount of current shunted by said shunt resistance when said translating device is effective and to control the flow of current to the battery in said auxiliary circuit when said translating device is ineffective.

7. In apparatus of the character described, in combination, a storage battery, an intermittently effective circuit arranged to have included therein said battery for charging, an auxiliary circuit arranged to have included therein said battery for charging, a two-way switch for controlling said circuits, means responsive to the electrical condition of said first-mentioned circuit and responsive to the state of charge of said battery for controlling said switch.

8. In apparatus of the character described, in combination, an intermittently effective circuit and an auxiliary circuit, a storage battery arranged to be included in either of said circuits to receive a charging current therefrom, a two-way switch adapted in one position to connect said battery in said first-mentioned circuit and in its other position to connect the battery in said auxiliary circuit, means responsive to effective condition of said first-mentioned circuit for moving said switch into said one position, and means arranged to permit movement of said switch into its other position upon said battery approaching substantially discharged condition but controlled by said last-mentioned means.

9. In apparatus of the character described in combination, two charging circuits and a storage battery in either of which said battery may be included to receive charging current therefrom, a two-way switch adapted in one position to include said battery in one circuit and in the other position to permit inclusion of said battery in the other circuit, means independent of said battery for controlling one of said circuits, means responsive to the closing operation of said last-mentioned means for moving said switch in position to include the battery in the circuit thus closed, and means responsive to battery conditions for causing movement of said switch into its other position to include the battery in the other circuit but arranged to be effective only when said circuit-controlling means is in open position.

10. In apparatus of the character described, in combination, two charging circuits and a storage battery in either of which said battery may be included to receive charging current therefrom, a two-way switch adapted in one position to include said battery in one circuit and in the other position to permit inclusion of said battery in the other circuit, means independent of said battery for controlling one of said circuits, a coil responsive to the closing of said last-mentioned means for moving said switch in position to include the battery in the circuit thus closed, and a coil adapted upon said battery approaching substantially discharged position to cause movement of said switch into its other position to include said battery in said other circuit, said two coils being related to each other so that said first-mentioned coil, upon energization, is preponderant over said second-mentioned coil.

11. In apparatus of the character described, in combination, two charging circuits and a storage battery in either of which said battery may be included to receive charging current therefrom, a two-way switch adapted in one position to include said battery in one circuit and in the other position to permit inclusion of said battery in the other circuit, means independent of said battery for controlling one of said circuits, means responsive to the state of charge of said battery arranged, as long as said battery is in a state of substantial charge, to hold said switch in neutral position but as said battery approaches a state of substantial discharge to permit closure of one of said charging circuits, and means responsive to the closing operation of said controlling means to operate said switch to connect the battery to the other charging circuit.

12. In apparatus of the character described, in combination, a main circuit, an auxiliary circuit, and a storage battery arranged to be included in either of said circuits to receive a charging current therefrom, a two-way switch adapted in one position to include the battery in said auxiliary circuit, and in another position to include the battery in said main circuit, means for holding said switch in neutral position and adapted upon said battery approaching substantially discharged condition to cause movement of the switch into one position to include the battery in said auxiliary charging circuit, and means responsive to effective charging condition of said main circuit for moving said switch into its other position to include the battery in said main charging circuit.

13. In apparatus of the character described, in combination, a storage battery, an intermittently effective circuit having included therein a resistance, an auxiliary circuit, a two-way switch for controlling the connection of said battery with respect to said two circuits, means responsive to effective condition of said first-mentioned circuit for moving said switch in one position to connect said battery in shunt relation to said resistance, and means responsive to the state of charge of said battery but controlled by said last-mentioned means for controlling the movement of said switch into another position to include the battery in said auxiliary charging circuit.

14. In apparatus of the character described in combination, a storage battery, an intermittently effective circuit having included therein a resistance, an auxiliary circuit, a two-way switch for controlling the connection of said battery with respect to said two circuits, means responsive to effective condition of said first-mentioned circuit for moving said switch in one position to connect said battery in shunt relation to said resistance, means responsive to the state of charge of said battery but controlled by said last-mentioned means for controlling the movement of said switch into another position to include the battery in said auxiliary charging circuit, and means responsive to the state of charge of said battery for cutting down the current to the battery as the latter approaches substantially full charge.

15. In apparatus of the character described, in combination, a storage battery, an intermittently effective circuit having included therein a resistance, an auxiliary circuit, a two-way switch for controlling the connection of said battery with respect to said two circuits, means responsive to effective condition of said first-mentioned circuit for moving said switch in one position to connect said battery in shunt relation to said resistance, means responsive to the state of charge of said battery but controlled by said last-mentioned means for controlling the movement of said switch into another position to include the battery in said auxiliary charging circuit, and means responsive to the state of charge of said battery for cutting down the current to the battery as the latter approaches substantially full charge, said last-mentioned means being arranged to be effective in either of said circuits.

16. In apparatus of the character described, in combination, a storage battery, an intermittently effective circuit to have included therein said battery for charging, an auxiliary circuit arranged to have included therein said battery for charging, a two-way switch for controlling said circuits, regulating means effective in either of said circuits for cutting down the charging current to the battery as the latter approaches substantially full charge, means responsive to effective condition of said first-mentioned circuit for operating said switch to close the latter circuit, and means responsive to the state of charge of said battery for operating said switch to close said auxiliary circuit, said regulating means being arranged to affect the circuit-opening operation of said last-mentioned means as the battery approaches substantially full charge.

17. In apparatus of the character described, in combination, a circuit adapted to be connected to a source of current and having included therein a translating device and a storage battery connected so that when said device receives current from said source said battery will also receive current therefrom, an auxiliary circuit adapted to be connected to said source of current and arranged to supply charging current to said battery independently of said first-mentioned circuit, means adapted to control each of said circuits, and means for cutting down the flow of current to said battery as the latter is substantially fully charged, said means being effective in either of said circuits and being arranged to affect the circuit-opening operation of said circuit-controlling means.

18. In apparatus of the character described, in combination, a circuit adapted to be connected to a source of current, a storage battery, a switch for controlling the connection of said battery to said circuit, means arranged to cause a closure of said switch upon said battery approaching a state of substantial discharge and arranged upon said battery approaching a state of substantial charge to tend to effect an opening of said switch, a coil responsive to charging current arranged to hold said switch in closed position, and means for cutting down the flow of charging current to said battery as the latter approaches substantially full charge.

19. In apparatus of the character described, in combination, a circuit adapted to be connected to a source of current, a storage battery, a switch for controlling the connection of said battery to said circuit, a coil responsive to battery voltage arranged, upon a predetermined decrease in the voltage of said battery to permit closure of said switch and arranged upon a predetermined increase in the voltage of said battery to open said switch, a coil responsive to charging current acting in opposition to said voltage coil and arranged to hold said switch in closed position, and means for cutting down the charging current to the battery as the latter approaches substantially full charge and arranged to decrease the effect of said current coil to permit said voltage coil to open said switch.

20. In apparatus of the character described, in combination, a storage battery, an intermittently effective circuit and an auxiliary circuit, in either of which said storage battery may be included to receive charging current, a two-way switch adapted in one position to close said first-mentioned circuit and in another position to close said second-mentioned circuit, means responsive to the state of charge of said battery arranged to cause said switch to close said auxiliary circuit when said battery approaches a state of substantial discharge and to tend to move said switch in position to close said first-mentioned circuit as long as said battery is in a state of substantial charge, yieldable means arranged to prevent said last-mentioned means from moving said switch into position for closing said first-mentioned circuit, and means responsive to effective condition of said first-mentioned circuit adapted to overcome said yieldable means and to effect movement of said switch into a position to close said first-mentioned circuit.

21. In apparatus of the character described, in combination, a storage battery, an intermittently effective circuit and an auxiliary circuit, in either of which said storage battery may be included to receive charging current, a two-way switch adapted in one position to close said first-mentioned circuit and in another position to close said second-mentioned circuit, means responsive to the state of charge of said battery arranged to cause said switch to close said auxiliary circuit when said battery approaches a state of substantial discharge and to tend to move said switch in position to close said first-mentioned circuit as long as said battery is in a state of substantial charge, means arranged to prevent said last-mentioned means from closing said first-mentioned circuit, means responsive to effective condition of said first-mentioned circuit for moving said switch in a position to close said first-mentioned circuit, and means effective in either of said circuits for cutting down the flow of current to said battery as the latter approaches substantially full charge.

In testimony whereof, I have signed my name to this specification this 18th day of March, 1925.

WILLIAM T. KNIESZNER.